United States Patent
Parker

(10) Patent No.: US 11,104,076 B2
(45) Date of Patent: Aug. 31, 2021

(54) METHOD AND CALIBRATING AN INKJET BASED THREE-DIMENSIONAL PRINTING SYSTEM

(71) Applicant: 3D Systems, Inc., Rock Hill, SC (US)

(72) Inventor: Mark Raymond Parker, Portland, OR (US)

(73) Assignee: 3D Systems, Inc., Rock Hill, SC (US)

( * ) Notice: Subject to any disclaimer, the term of this patent is extended or adjusted under 35 U.S.C. 154(b) by 576 days.

(21) Appl. No.: 15/920,795

(22) Filed: Mar. 14, 2018

(65) Prior Publication Data

US 2018/0264741 A1    Sep. 20, 2018

Related U.S. Application Data

(60) Provisional application No. 62/472,749, filed on Mar. 17, 2017.

(51) Int. Cl.
| | |
|---|---|
| *B29C 64/393* | (2017.01) |
| *B33Y 30/00* | (2015.01) |
| *B29C 64/245* | (2017.01) |
| *B29C 64/209* | (2017.01) |
| *B29C 64/188* | (2017.01) |
| *B33Y 50/02* | (2015.01) |

(Continued)

(52) U.S. Cl.
CPC .......... *B29C 64/393* (2017.08); *B29C 64/112* (2017.08); *B29C 64/188* (2017.08); *B29C 64/209* (2017.08); *B29C 64/236* (2017.08); *B29C 64/245* (2017.08); *B29C 64/264* (2017.08); *B33Y 30/00* (2014.12); *B33Y 50/02* (2014.12)

(58) Field of Classification Search
CPC ... B29C 64/393; B29C 64/112; B29C 64/245; B29C 64/236; B29C 64/188; B29C 64/264; B29C 64/209; B33Y 30/00; B33Y 50/02
See application file for complete search history.

(56) References Cited

U.S. PATENT DOCUMENTS

| | | | |
|---|---|---|---|
| 7,077,638 B2 | 7/2006 | Leyden et al. | |
| 7,229,144 B2 | 6/2007 | Nielsen et al. | |

(Continued)

FOREIGN PATENT DOCUMENTS

| | | |
|---|---|---|
| JP | 2003-181941 | 7/2003 |
| JP | 2004-151104 | 5/2004 |

(Continued)

OTHER PUBLICATIONS

PCT International Search Report the International Searching Authority for PCT/US2018/0122333, dated May 23, 2018 (6 pages).

(Continued)

*Primary Examiner* — Robert J Grun

(57) ABSTRACT

In an aspect of the disclosure a three dimensional printing system includes an elevator mechanism for supporting a build plate, a printhead assembly, a movement mechanism, and a controller. The printhead assembly includes a printhead and a planarizer arranged along a scan axis. The movement mechanism is for scanning the printhead across the build plate. The controller is configured to: (a) print one or more base layers of ink onto the build plate, (b) print one or more layers of test patterns onto the base layers until an alignment determination can be made, wherein the test patterns comprise different timing values, and (c) receive information and update a scan axis timing parameter based on the determination.

15 Claims, 5 Drawing Sheets

(51) Int. Cl.
*B29C 64/264* (2017.01)
*B29C 64/236* (2017.01)
*B29C 64/112* (2017.01)

(56) References Cited

U.S. PATENT DOCUMENTS

| | | |
|---|---|---|
| 9,216,603 B1 | 12/2015 | Mizes et al. |
| 2015/0321426 A1 | 11/2015 | Lee et al. |
| 2016/0059491 A1 | 3/2016 | Lee et al. |

FOREIGN PATENT DOCUMENTS

| | | |
|---|---|---|
| JP | 2016-135595 | 7/2016 |
| WO | 2004024447 | 3/2004 |

OTHER PUBLICATIONS

PCT Written Opinion of the International Searching Authority for PCT/US2018/0122333, dated May 23, 2018 (5 pages).

English Translation of Office Action for Japanese Patent Application No. 2019-548734, dated Dec. 3, 2020 (3 pages).

English Transiation of First Examination Report for India Patent Application No. 201917036928, dated Jan. 1, 2021 (5 pages)

METHOD AND CALIBRATING AN INKJET BASED THREE-DIMENSIONAL PRINTING SYSTEM

CROSS REFERENCE TO RELATED APPLICATIONS

This non-provisional patent application claims priority to U.S. Provisional Application Ser. No. 62/472,749, Entitled "METHOD OF CALIBRATING AN INKJET BASED THREE DIMENSIONAL PRINTING SYSTEM" by Mark Raymond Parker, filed on Mar. 17, 2017, incorporated herein by reference under the benefit of U.S.C. 119(e).

FIELD OF THE INVENTION

The present disclosure concerns an apparatus and method for fabrication of solid three dimensional (3D) articles of manufacture from the selective deposition of materials from an inkjet printhead. More particularly, the present disclosure concerns an apparatus and method for accurately calibrating a printing system that is suitable for use with phase change inks and photocurable inks.

BACKGROUND

Three dimensional (3D) printing systems are in rapidly increasing use for purposes such as prototyping and manufacturing. One type of 3D printer utilizes an inkjet printhead to selectively deposit a material to form a three dimensional (3D) article of manufacture. The printhead scans along a "scan axis" and selectively and repeatedly forms layers that cumulatively define the three dimensional (3D) article of manufacture. In some embodiments each layer can be UV cured. In other embodiments phase change inks are used. As known in the art, the term "ink" includes both build materials and support materials.

Phase change inks typically incorporate a wax material. Phase change inks are solid at room temperature or about 25 degrees Celsius. These inks are handled at elevated temperatures in the printing system to facilitate providing the ink to the printhead and ejection. Because they solidify upon impact, these inks do not tend to flow from defined lateral boundaries after dispensing. Thus they enable accurate lateral critical dimensions. However, they have some challenges including a tendency to form a bumpy or rough surface during printing.

Also, while phase change inks allow more precise lateral positioning, they are less "forgiving" when lateral dispensing errors occur. This is because other inks that are not phase change tend to flow and spread which negates drop placement errors. Thus achieving accurate alignment for phase change inks is more important than it is for other kinds of inks that are a liquid at room temperature. What is needed is an overall solution that achieves planarity relative to the vertical direction and accuracy in the lateral direction.

SUMMARY

Figure 1:
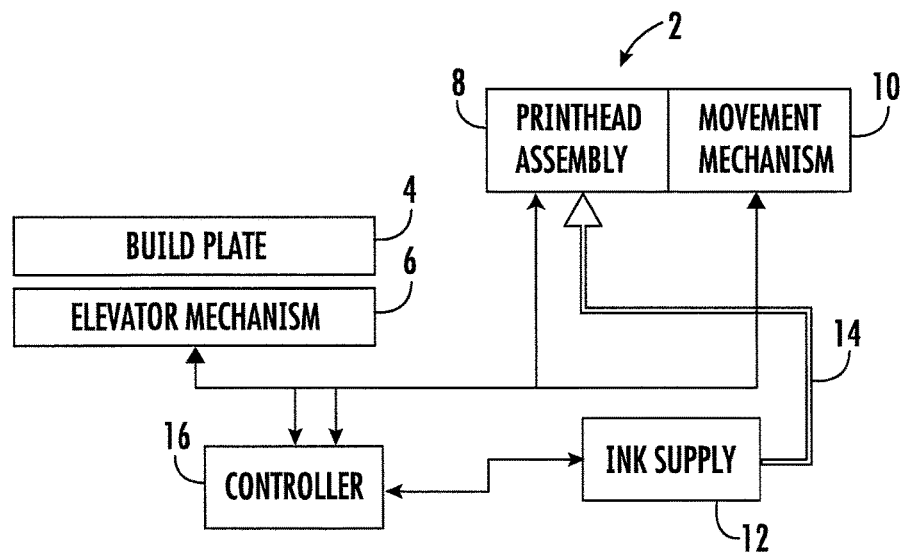
FIG. 1 is a schematic block diagram depicting an exemplary three dimensional printing system.

In first aspect of the disclosure a three dimensional printing system includes an elevator mechanism for supporting a build plate, a printhead assembly, a movement mechanism, and a controller. The printhead assembly includes a printhead and a planarizer arranged along a scan axis. The printhead assembly is configured to translate, relative to the build plate, along the scan axis whereby the planarizer leads or follows the printhead along a scan. The printhead includes a downwardly facing ejector face. The planarizer defines a planarizing plane that is offset downwardly from the ejector face by a trajectory height $H_T$. The movement mechanism is for scanning the printhead across the build plate. The controller is configured to: (a) print one or more base layers of ink onto the build plate, (b) print one or more layers of test patterns onto the base layers until an alignment determination can be made, wherein the test patterns comprise different timing values, and (c) receive information and update a scan axis timing parameter based on the determination.

In one implementation the controller includes a processor coupled to an information storage device. The information storage device includes a non-volatile or non-transient storage device storing instructions that, when executed by the processor, control the elevator mechanism, the printhead assembly, the movement mechanism, and other portions of the three dimensional printing system during the formation of a three dimensional article of manufacturing and during a calibration process. The controller can be at one location or distributed among a plurality of locations in the printing system. In one embodiment the controller includes an external controller that is external to a print engine and an internal controller that is internal to a print engine.

In another implementation the printhead is configured to eject a phase change ink that is solid at 25 degrees Celsius and is ejected in a liquid state at an elevated temperature. The phase change ink can have a melting point in a range of 60 to 140 degrees Celsius or a range of 80 to 100 degrees Celsius. The phase change ink can have a plurality of components that have different melting points and may therefore not exhibit a specific or distinct melting point. The three dimensional printing system includes an ink supply system that heats and melts the ink before delivering it to the printhead. The phase change ink can include a wax component that provides the phase change property.

In yet another implementation the printhead ejects two different phase change inks including a build material and a support material. Both phase change inks are solid at 25 degrees Celsius or room temperature. The build material has a higher melting point than the support material. The melting point of the inks can be somewhere in a range of 60 to 140 degrees Celsius or a range of 80 to 100 degrees Celsius.

In a further implementation the printhead ejects two different inks including a build material and a support material. The build material is an ultraviolet (UV) curable ink. The support material is a phase change ink that is solid at 25 degrees Celsius and has a melting point at an elevated temperature which may be in a range of 60 to 140 degrees Celsius or a range of 80 to 100 degrees Celsius.

In a yet further implementation the printhead assembly includes a plurality of different printheads which print a plurality of different inks. The plurality of different inks can include one or more of a phase change ink and a UV curable ink. The printhead assembly can includes a single planarizer or a plurality of planarizers or a planarizer for each printhead.

In another implementation according to step (a) the controller is configured to print the base layers while the elevator mechanism maintains the build plate at a fixed vertical position. The base layers are printed until the planarizing plane is proximate to an upper surface of ink defined by the base layers or until the planarizer begins to planarize the base layers. Then according to step (b) the controller begins to incrementally lower the build plate after printing each layer of the test pattern.

In a second aspect of the disclosure a three dimensional printing system includes an elevator mechanism for supporting a build plate, a printhead assembly, a movement mechanism, and a controller. The printhead assembly includes a printhead and a planarizer arranged along a scan axis. The movement mechanism is configured to impart relative movement between the printhead and the build plate along the scan axis whereby the planarizer leads or follows the printhead along a scan. The printhead includes a downwardly facing ejector face. The planarizer defines a planarizing plane that is offset downwardly from the ejector face by a trajectory height $H_T$. The movement mechanism is for scanning the printhead across the build plate. The controller is configured to: (a) operate the printhead and the movement mechanism for ejecting a plurality of base layers of ink onto the build plate while maintaining the build plate at a fixed vertical height until a cumulative thickness of the base layers of ink reach a base height $H_B$ whereby the planarizer begins to engage the layers of ink or is proximate to an upper surface of the base layers, (b) print a layer of a test pattern onto the base layers, (c) increment the base downwardly by a layer thickness, (d) repeat b and c for a plurality of test pattern layers until an alignment determination can be made, (e) receive information based upon the test pattern, and (f) update machine timing parameters to more accurately align the three dimensional printing system along the scan axis.

In one implementation the base height $H_B$ is at least 200 microns. In a first embodiment the base height $H_B$ is at least 300 microns. In a second embodiment the base height $H_B$ is at least 400 microns. In a third embodiment the base height $H_B$ is in a range of about 400 to 600 microns.

DETAILED DESCRIPTION OF THE PREFERRED EMBODIMENTS

Figure 2:
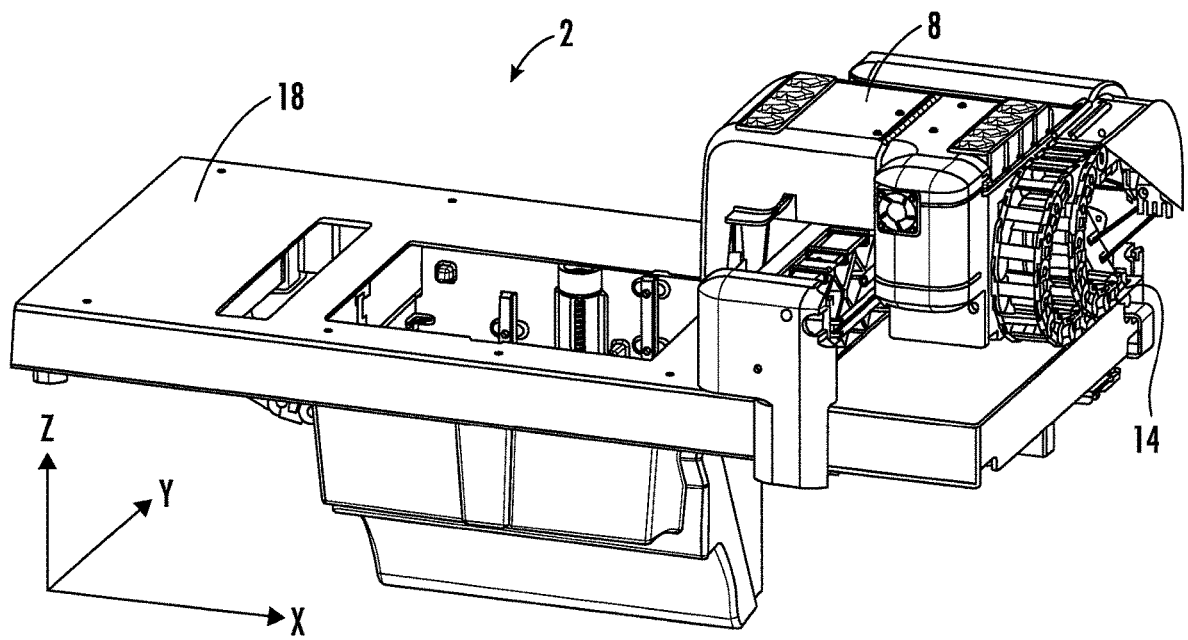
FIG. 2 is an isometric illustration of an exemplary three dimensional printing system.

FIG. 1 is a schematic block diagram of an exemplary printing system 2. FIG. 2 is a isometric drawing printing system 2 that illustrates an exemplary physical arrangement of components. In describing the printing system 2, mutually orthogonal axes X, Y, and Z are utilized. The axes X and Y will be referred to "lateral" or "horizontal" axes and Z will be described as a "vertical" axis. However, it is to be understood that Z is not necessarily perfectly aligned with a gravitational reference. Also X will refer to a "scan" axis and Y will refer to a "transverse" axis. The direction +Z is referred to as a generally "upward" direction and −Z is a generally "downward" direction.

Printing system 2 includes an elevator mechanism 6 for supporting, aligning, and vertically positioning a build plate 4. The build plate 4 is typically formed from a rigid material such as aluminum and includes an upper surface upon which a three dimensional (3D) article of manufacture is to be formed. The rigidity is important so that accurate positional and dimensional tolerances can be achieved. The elevator mechanism 6 is configured to controllably position the build plate 4 along the vertical axis Z.

Printing system 2 includes a printhead assembly 8 that is supported and laterally translated by a movement mechanism 10. Movement mechanism 10 is configured to translate the printhead assembly 8 along scan axis X as printhead assembly 8 selectively deposits drops of ink onto the build plate 6 to form layers of a three dimensional (3D) article of manufacture. In alternative embodiments, the build plate is mounted to a movement mechanism that laterally translates the build plate, and the printhead assembly is mounted to an elevator mechanism to vertically position the printhead assembly relative to the build plate. Further embodiments of the present invention include alternative mechanisms for moving the printhead assembly relative to the build plate in the X, Y, and Z axes.

Printhead assembly 8 receives ink from an ink supply 12 via an ink path 14. In an exemplary embodiment the ink path 14 is a heated tube that transports a phase change ink from ink supply 12 to the printhead assembly 8. Controller 16 is configured to operate the printing system 2 for printing a three dimensional (3D) article of manufacture and during a calibration method which is to be described.

As illustrated in FIG. 2, the printing system 2 includes a chassis 18 which supports various components including the printhead assembly 8. The printhead assembly scans along scan axis X and includes an array of nozzles that are disposed along the transverse axis Y. The nozzles can be numbered versus position along the axis Y with a sequence of integers. In such an embodiment, the number alternates between an even integer and an odd integer versus position. Those nozzles designated by an even integer can be referred to as "even nozzles" and those designated by an odd integer can be referred to as "odd nozzles." This convention will be utilized in the discussion that follows.

Figure 3:
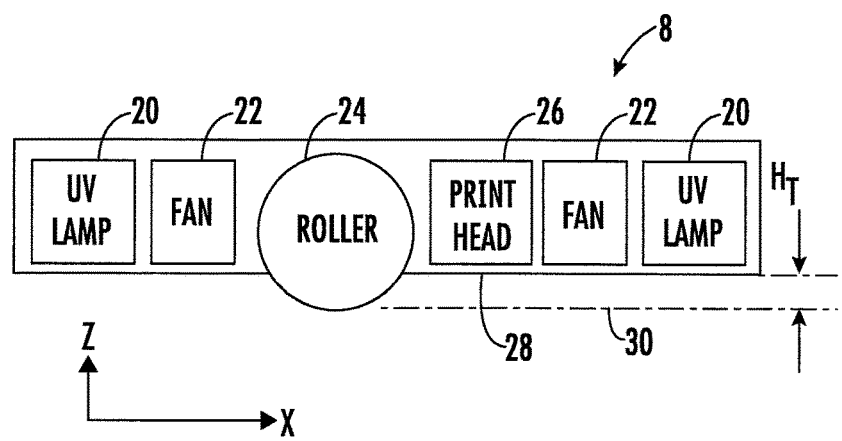
FIG. 3 is a schematic diagram illustrating an arrangement of components in a printhead assembly.

FIG. 3 schematically depicts an exemplary printhead assembly 8 along the scan axis X. Arranged along X, the printhead assembly 8 includes two UV lamps 20, two fans 22, a planarizer roller 24, and a printhead 26. The printhead 26 has a lower face 28. The planarizer roller 24 is configured to impact and planarize material that extends above a planarizing plane 30. A vertical distance $H_T$ extends between the lower face 28 and the planarizing plane 30. Vertical distance $H_T$ will be referred to as a "trajectory height" $H_T$ as will be explained later.

The printhead 26 can include different groups of nozzles to print different inks. If some of these inks are UV curable (curable with ultraviolet light) then the UV lamp 20 can be operated to cure the inks. In some embodiments the printing system 2 will not utilize UV curable inks and then the UV lamps 20 are not required.

FIG. 3 depicts a printhead assembly 8 has having one printhead 26 and one planarizer roller 24. In one alternative embodiment, the printhead assembly 8 can include a plurality of printheads 26 and one planarizer roller 24. In another alternative embodiment, the printhead assembly 8 can include a plurality of printheads 26 with a separate planarizer roller 24 for each printhead 26.

Figure 4:
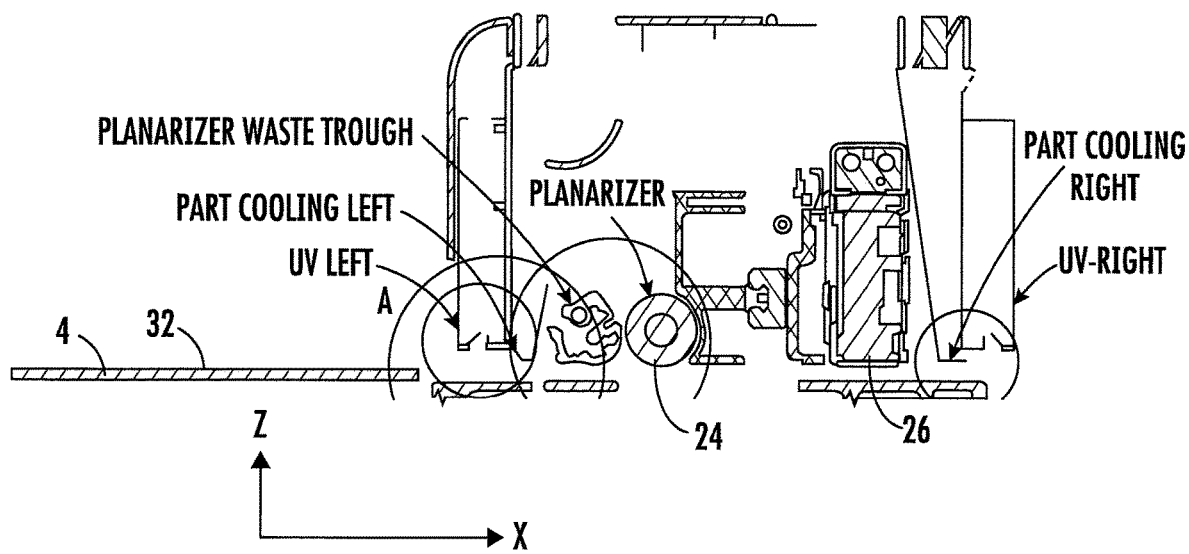
FIG. 4 is a cross sectional view of an exemplary portion of a three dimensional printing system.

FIG. 4 is a cross sectional view of an exemplary portion of printing system 2 including build plate 4, planarizer 24, printhead 26, and other components. It is undesirable for the planarizer 24 to directly impact the build plate 4. The planarizing plane 30 is initially at a vertical distance $H_B$ above an upper surface 32 of the build plate 4 that is minimized while assuring that the planarizer will not "crash" into the build plate 4.

Figure 5:
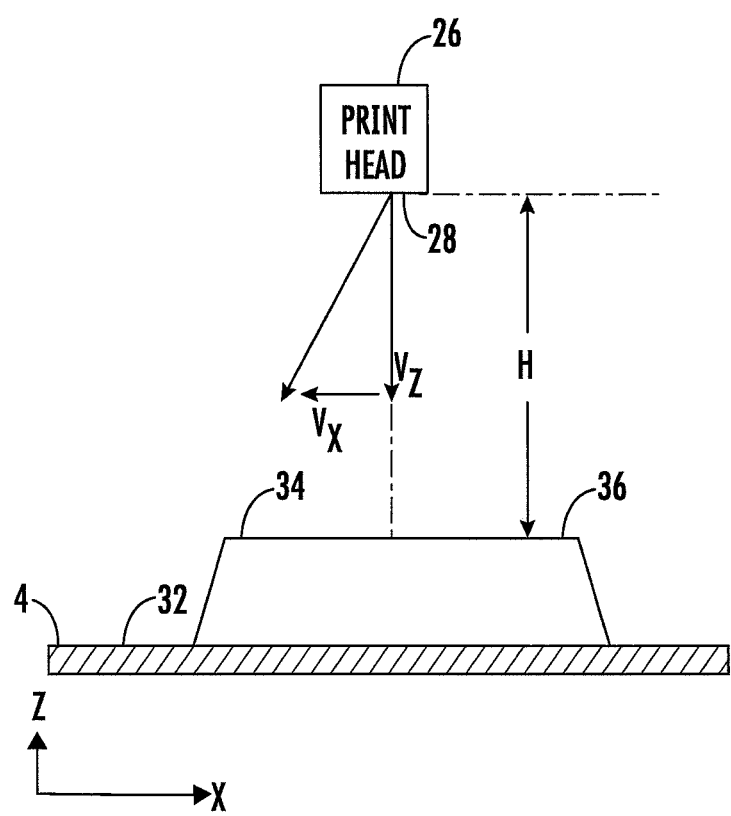
FIG. 5 is a schematic diagram depicting a trajectory of ink drops ejected from a printhead.

An important parameter for achieving accurate critical dimensions is a vertical drop trajectory distance H between the lower face 28 of the printhead 26 and an upper surface 34 upon which ejected ink drops from printhead 26 land. FIG. 5 depicts the upper surface 34 as a top of some previously printed ink 36 that have an effect of reducing H. In this illustrative figure, the printhead 26 is traversing from right to left with a horizontal velocity component Vx. The printhead 26 is configured to eject droplets with a vertical velocity Vz when the printhead is standing still. But with the printhead moving, the drops also have the horizontal velocity component Vx. During their flight from the printhead face 28 to surface 34, the drops have receive a scan direction offset equal to about H times (Vx divided by Vz). When printing is performed in both directions, the horizontal offset between the +X scan and the −X scan is doubled.

If H and the Vz are both precisely known then the horizontal offset is easily compensated for by adjusting a timing of firing drops. However, due to mechanical tolerances, H is generally not precisely known. Moreover, Vz is also not precisely known. When the printing system 2 begins printing onto the upper surface 32, the value of H equals $H_B$ plus $H_T$. Later, as the printed ink 36 builds up, the value of H will stabilize on a value of $H_T$ because of the effect of the planarizer 24.

Figure 6:
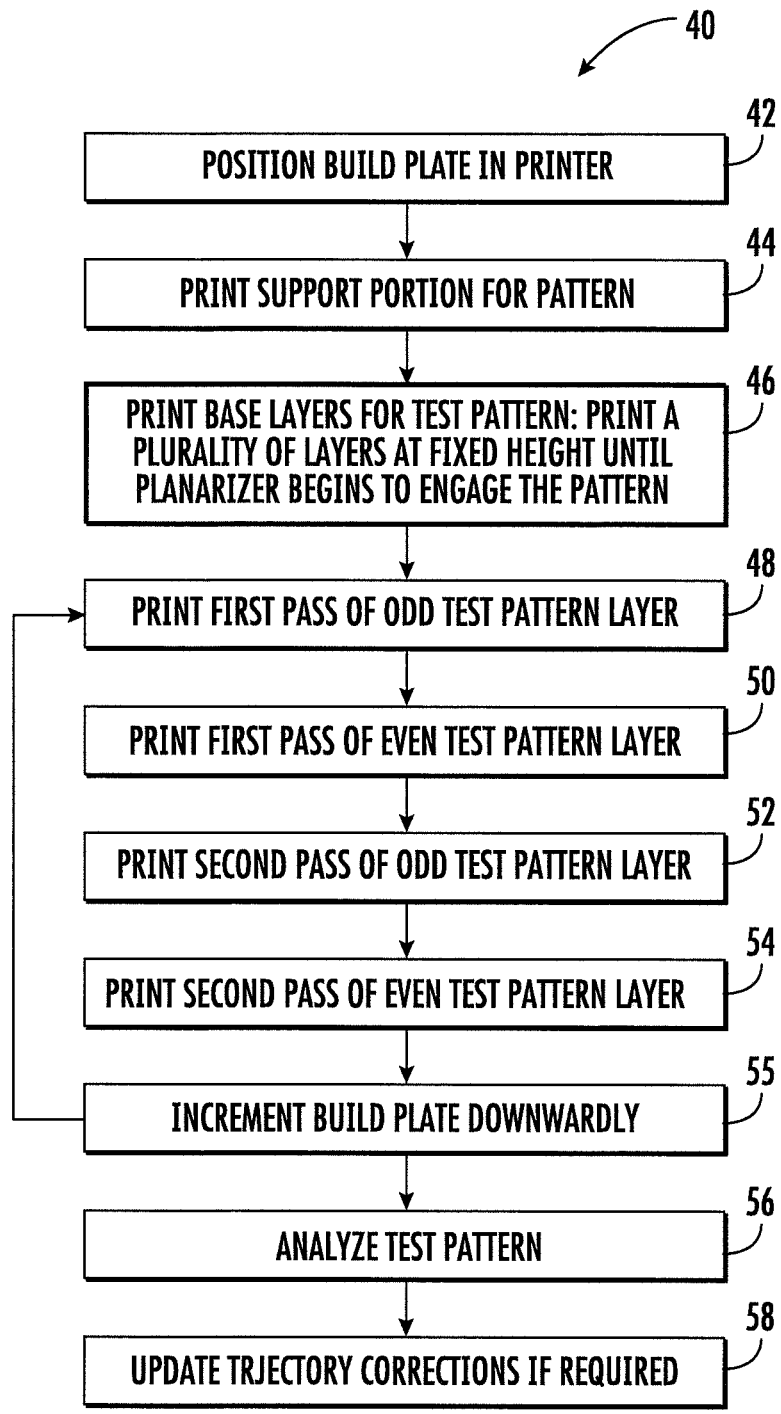
FIG. 6 is a flowchart depicting an exemplary method for providing dimensional control in a three dimensional printing system.

FIG. 6 is a flowchart depicting a method 40 for providing dimensional control for printing a 3D article of manufacture in the printing system 2. According to step 42 a clean build plate 4 is positioned in the three dimensional printing system 2 to be aligned and engaged with elevator mechanism 6.

According to step 44 a support portion 60 (see FIG. 8) is printed upon the upper surface 32 of the build plate 4 while the elevator mechanism 6 maintains the build plate at a fixed vertical height. The support portion 60 is formed from one or more printed layers of a support material. In one embodiment the support portion 60 is formed by the printing of six layers of support material.

In certain embodiments of the present invention, the test pattern is analyzed, in order to determine what, if any, update to the system scan axis timing parameters are necessary, by visually comparing gaps and/or overlaps within the test patterns. In order to provide improved visibility of the gaps and/or overlaps, certain embodiments provide a color contrast between the build plate and the test patterns and/or between the support material, comprising the support portion 60, and the test pattern. In embodiments in which the build plate is a black anodized aluminum plate and the support material is white, the support portion 60 is only a few layers in thickness in order to allow the black surface to remain visible and provide a stark contrast with the white support material of the test pattern. In further embodiments where the build material is dark, such as black or dark purple, the support portion 60 may be enough layers to provide a white color, when viewed from above, in order to provide a stark contrast with the dark build material. In yet further embodiments combinations of different inks are utilized to provide a contrast based on hue, gray scale, and/or luminance. Still further embodiments of the present invention may comprise support portions of various thickness, shape, and/or appearance in order to improve the visibility of the test patterns.

According to step 46 one or more base layers 62 (see FIG. 8) are printed to underlie a test pattern. In some embodiments, the base layers 62 are printed while the elevator mechanism 6 maintains the build plate at a fixed vertical height. Thus, the printing of the support portion 45 and the base layers 62 has the effect of reducing H because the upper surface 34 is "growing upward" while the lower face 28 of printhead 26 and the upper surface 32 of the build plate remain vertically fixed with respect to each other. Base layers 62 are printed until the planarizer 24 is proximate to, or begins to contact, the upper surface 34 of the printed ink 36.

Figure 7:
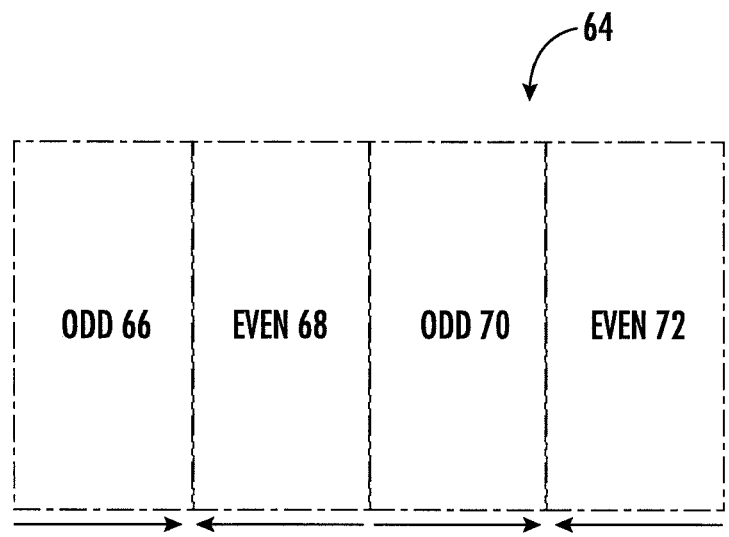
FIG. 7 is an exemplary portion of a test pattern for providing scan axis trajectory calibration for a three dimensional printing system.

According to step 48 to 54 a set of test patterns are printed. One such test pattern 64 of one embodiment of the present invention is illustrated in FIG. 7. This test pattern is printed using a certain "offset" of the drop ejection timing so as to compensate for the horizontal component Vx of drop velocity. The "odd" pattern is printed using odd nozzles when the printhead is moving from left to right. The "even" pattern is printed using even nozzles when the printhead is moving from right to left. Further embodiments print similar or alternative test patterns using any sequence of odd and even nozzles. Because the planarizer 24 has engaged the upper surface 34 of the printed ink, the height H is always equal to $H_T$ which is the vertical offset between the lower face 28 of printhead 26 and the planarizing plane 30. Therefore a scan-related offset distance of drops will be relatively fixed from layer to layer.

In step 48 of the illustrated embodiment, the "odd 66" portion of test pattern 64 is printed using a first set of odd nozzles. The planarizer 24 may engage the printed layer depending upon the direction along the X axis that the printhead assembly 8 laterally moves relative to the build plate 4. In step 50, the "even 68" portion of test pattern 64 is printed using a first set of even nozzles. The planarizer 24 may engage the printed layer depending upon the direction along the X axis that the printhead assembly 8 laterally moves relative to the build plate 4.

In step 52 the "odd 70" portion of test pattern 64 is printed using a second set of odd nozzles. The planarizer 24 may engage the printed layer depending upon the direction along the X axis that the printhead assembly 8 laterally moves relative to the build plate 4. In step 54, the "even 72" portion of test pattern 64 is printed using a second set of even nozzles. The planarizer 24 may engage the printed layer depending upon the direction along the X axis that the printhead assembly 8 laterally moves relative to the build plate 4. According to step 55, the elevator mechanism 6 increments the build plate downwardly by an amount equal to a single layer thickness.

Steps 48 to 55 are repeated until enough test pattern layer segments 74 are generated to accurately read the test patterns 64. A test pattern can comprise a plurality of patterns 64 like that illustrated in FIG. 7 that are generated with different timing values. A timing value is a start time for a nozzle to begin ejecting drops to form a pattern segment 74. The timing values can be adjusted whereby the drops for different printheads and different scan directions can be aligned. The pattern 64 is designed whereby alignment is recognized when two pattern segments (e.g., "ODD 66" and "EVEN 68") "butt up" against each other without a gap or overlap. When 66 and 68 overlap, then 68 and 70 will exhibit a gap therebetween. Thus a manual observation of the pattern 64 can be used to determine whether the timing values properly align the drops. By providing a plurality of test patterns 64, a user or machine vision system can select a pattern 64 without gaps or overlaps, which corresponds to a proper set of timing values. Thus, in steps 48 to 54, a plurality of the test patterns 64 can be generated to provide a comparison with different timing values.

According to step 56, the test patterns 64 are analyzed. This can be done manually by selecting a test pattern 64 having the smallest gaps between columns of odd and even portions of the test pattern 64. Alternatively the selection can be automatically performed by a vision system associated or included with the printing system 2.

According to step 58, the analyzed test patterns are utilized to update a drop timing parameter. This can be done with an input to a user interface generated by printing system 2 or in a fully automated manner.

In an alternative embodiment, an alternative type of test pattern can be printed other than the one described with respect to steps 48 to 54. This alternative test pattern would still be printed upon a base layer that is printed before the planarizer 24 begins to engage the upper surface 34 of the printed ink. Again, the test pattern would be printed in which H equals $H_T$ which is the vertical offset between the lower face 28 of the printhead 26 and the planarizing plane 30.

Figure 8:
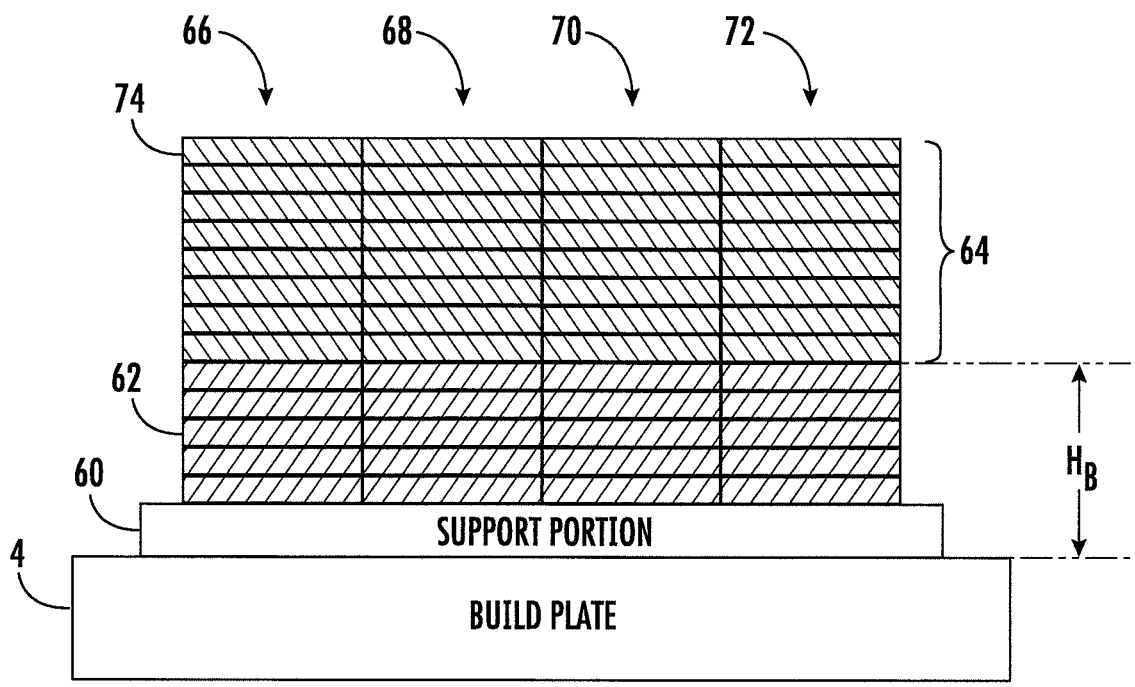
FIG. 8 is a cross sectional view of the test pattern of FIG. 7.

Referring now to the embodiment of FIG. 8, the support portion 60 and the base layers 62 can all be referred to as "base layers" 62 because these are the layers that underlie the test pattern 64. The test pattern layer segments 74 cumulatively form the test pattern 64. In one embodiment there are about 20-40 base layers 62 including the support portion 60 that cumulatively define a height equal to at least $H_B$. In that embodiment, the test pattern 64 can include at least 30 test pattern layers 74. In an exemplary embodiment the combination of the base layers 62 (including support portion 60) and the test pattern layers include a total of about 100-110 layers. Still further embodiments may define fewer layers to reduce build time and material consumption, but may reduce the ability to accurately analyze the test patterns. Yet further embodiments may define additional layers to improve the ability to accurately analyze the test patterns, but may require the test method to take more time and consume more material.

The support portion 60 of the base layers 62 completely underlies remaining base layers 62 and the test pattern 64. When the support portion 60 is formed from a phase change ink it has been found that cooling the build plate 4 allows for a quick and easy removal of the ink. This is important for the convenient cleaning and reuse of the build plate 4.

Although FIG. 8 illustrates only a single test pattern 64 for a single material, further embodiments of the present invention include additional test patterns for additional materials, such as for the support material, a plurality of different build materials, and/or a plurality of different color materials. Such additional test patterns are included during a single test method or may be done individually or in groups depending upon the number and size of test patterns needed relative to the area of the build plate.

In some embodiments, the test patterns 64 are all printed close together in order to have comparable results for optimizing drop timing. In other embodiments, one or more test patterns 64 can be repeated at different locations across the build plate 4 in order to characterize the effect of print location on pattern alignment.

The specific embodiments and applications thereof described above are for illustrative purposes only and do not preclude modifications and variations encompassed by the scope of the following claims.

What I claim is:

1. A three dimensional printing system for fabricating a three dimensional article of manufacture comprising:

an elevator mechanism for supporting a build plate;

a printhead assembly configured to scan over the build plate along a scan axis, the printhead assembly including a printhead and a planarizer arranged along the scan axis whereby the planarizer leads or follows the printhead during a scan, the printhead including an ejector face, the planarizer defining a planarizing plane that is offset downwardly from the ejector face by a trajectory height $H_T$;

a movement mechanism for scanning the printhead assembly across the build plate; and a controller configured to:

(a) operate the printhead and the movement mechanism for eject a plurality of base layers of ink onto the build plate while maintaining the build plate at a fixed vertical height until a cumulative thickness of the base layers of ink reach at least a base height $H_B$ whereby the planarizing plane is at least proximate to an upper surface of the plurality of base layers;

(b) print a layer of a test pattern onto the base layers;

(c) increment the build plate downwardly by a layer thickness;

(d) repeat b and c for a plurality of test pattern layers until an alignment determination can be made;

(e) receive information based upon the test pattern; and (f) update machine timing parameters to more accurately align the three dimensional printing system along the scan axis.

2. The three dimensional printing system of claim 1 wherein the planarizer begins to engage the base layers of ink before step (b).

3. The three dimensional printing system of claim 1 wherein the base layers define a support portion formed from a phase change ink.

4. The three dimensional printing system of claim 3 wherein the base layers include a plurality of layers of build material printed over the support portion.

5. The three dimensional printing system of claim 4 wherein the build material is formed from a phase change ink having a higher average melting point than the support portion.

6. The three dimensional printing system of claim 4 wherein the build material is formed from a UV curable ink.

7. The three dimensional printing system of claim 6 wherein the build material includes a phase change component.

8. A method of fabricating a three dimensional article of manufacture comprising:

providing:

an elevator mechanism for supporting a build plate;

a printhead assembly configured to scan over the build plate along a scan axis, the printhead assembly including a printhead and a planarizer arranged along the scan axis whereby the planarizer leads or follows the printhead during a scan, the printhead including an ejector face, the planarizer defining a planarizing plane that is offset downwardly from the ejector face by a trajectory height $H_T$;

a movement mechanism for scanning the printhead assembly across the build plate;

(a) operating the printhead and the movement mechanism for eject a plurality of base layers of ink onto the build plate while maintaining the build plate at a fixed vertical height until a cumulative thickness of the base layers of ink reach at least a base height $H_B$ whereby the planarizing plane is at least proximate to an upper surface of the plurality of base layers;

(b) printing a layer of a test pattern onto the base layers;
(c) incrementing the build plate downwardly by a layer thickness;
(d) repeating b and c for a plurality of test pattern layers until an alignment determination can be made;
(e) receiving information based upon the test pattern; and
(f) updating machine timing parameters to more accurately align the three dimensional printing system along the scan axis.

9. The method of claim 1 wherein the planarizer begins to engage the base layers of ink before step (b).

10. The method of claim 1 wherein the base layers define a support portion formed from a phase change ink.

11. The method of claim 3 wherein the base layers include a plurality of layers of build material printed over the support portion.

12. The method of claim 4 wherein the build material is formed from a phase change ink having a higher average melting point than the support portion.

13. The method of claim 4 wherein the build material is formed from a UV curable ink.

14. A non-transient storage device storing software instructions for a three dimensional printer, the three dimensional printer including an elevator mechanism for supporting a build plate, a printhead assembly configured to scan over the build plate along a scan axis, the printhead assembly including a printhead and a planarizer arranged along the scan axis whereby the planarizer leads or follows the printhead during a scan, the printhead including an ejector face, the planarizer defining a planarizing plane that is offset downwardly from the ejector face by a trajectory height $H_T$, and a movement mechanism for scanning the printhead assembly across the build plate, when executed by a processor, the software instructions are configured to:
(a) operate the printhead and the movement mechanism for eject a plurality of base layers of ink onto the build plate while maintaining the build plate at a fixed vertical height until a cumulative thickness of the base layers of ink reach at least a base height $H_B$ whereby the planarizing plane is at least proximate to an upper surface of the plurality of base layers;
(b) print a layer of a test pattern onto the base layers;
(c) increment the build plate downwardly by a layer thickness;
(d) repeat b and c for a plurality of test pattern layers until an alignment determination can be made;
(e) receive information based upon the test pattern; and
(f) update machine timing parameters to more accurately align the three dimensional printing system along the scan axis.

15. The non-transient storage device of claim 14 wherein the planarizer begins to engage the base layers of ink before step (b).

* * * * *